United States Patent [19]
Ramirez

[11] Patent Number: 5,868,104
[45] Date of Patent: Feb. 9, 1999

[54] PET SUNGLASSES SYSTEM

[76] Inventor: Yolanda Ramirez, 3532 Kelburn Dr., Fayetteville, N.C. 28311

[21] Appl. No.: 41,427

[22] Filed: Mar. 12, 1998

[51] Int. Cl.[6] .................................................. A01K 29/00
[52] U.S. Cl. ............................................................ 119/850
[58] Field of Search ..................... 119/850, 856, 119/174; 351/68, 128, 41; 54/86.2; 2/426, 431, 438, 439, 442, 445, 446, 448, 454

[56] References Cited

U.S. PATENT DOCUMENTS

| | | |
|---|---|---|
| 1,942,393 | 1/1934 | Baker . |
| 2,065,935 | 12/1936 | Grossman . |
| 2,580,605 | 1/1952 | Schauweker . |
| 3,605,116 | 9/1971 | Simpson et al. . |
| 3,610,743 | 10/1971 | Lindblom . |
| 3,880,503 | 4/1975 | Uribe . |
| 4,129,362 | 12/1978 | Lorenzo . |
| 4,264,987 | 5/1981 | Runckel ..................................... 2/428 |
| 4,348,775 | 9/1982 | Haslbeck ..................................... 2/452 |
| 5,459,534 | 10/1995 | Morrison ................................. 351/128 |
| 5,732,415 | 3/1998 | Boyd ....................................... 119/850 |

*Primary Examiner*—Thomas Price

[57] ABSTRACT

A pair of glasses for a small animal is provided including a pair of glasses each having a frame and a lens mounted therein. Each frame has a linear arm having a first end coupled to the frame and extending rearwardly therefrom. An interconnect is connected to an inboard edge of each of the frames which permits the selective distancing thereof.

6 Claims, 2 Drawing Sheets

PET SUNGLASSES SYSTEM

BACKGROUND OF THE INVENTION

1. Field of the Invention

The present invention relates to pet accessories and more particularly pertains to a new pet sunglasses system for protecting eyes of a pet thereby precluding cataracts and other visual injury.

2. Description of the Prior Art

The use of pet accessories is known in the prior art. More specifically, pet accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet accessories include U.S. Pat. Nos. 5,031,388; 4,969,317; Des. 334,390; Des. 357,268; Des. 346,391; and Des. 319,116.

In these respects, the pet sunglasses system according to the present invention substantially departs from the conventional concepts and designs of the prior art, and in so doing provides an apparatus primarily developed for the purpose of protecting eyes of a pet thereby precluding cataracts and other visual injury.

SUMMARY OF THE INVENTION

In view of the foregoing disadvantages inherent in the known types of pet accessories now present in the prior art, the present invention provides a new pet sunglasses system construction wherein the same can be utilized for protecting eyes of a pet thereby precluding cataracts and other visual injury.

The general purpose of the present invention, which will be described subsequently in greater detail, is to provide a new pet sunglasses system apparatus and method which has many of the advantages of the pet accessories mentioned heretofore and many novel features that result in a new pet sunglasses system which is not anticipated, rendered obvious, suggested, or even implied by any of the prior art pet accessories, either alone or in any combination thereof.

To attain this, the present invention generally comprises a pair of glasses each having a separate generally rectangular frame and a sun-protective lens mounted therein. Each frame is equipped with a linear top and bottom edge and a pair of side edges including an inboard side edge and an outboard side edge. The inboard side edge includes a lower arcuate extent and an upper extent defining a compartment. Note FIG. 4. The outboard side edge has a linear arm with a first end fixedly and integrally coupled to an upper extent thereof and extended rearwardly therefrom in perpendicular relation therewith. Next provided is a flexible and elastic strap having a pair of ends coupled to second ends of the linear arms of the pair of glasses. A pair of compartments are each defined by a front wall, a rear wall, an inboard wall, an outboard wall, a top wall and a bottom wall. As such, an interior space is defined with a rectangular configuration, as shown in FIG. 4. It should be noted that the inboard wall is mounted to the associated lens. Further, the top and bottom walls are mounted to a remaining portion of the corresponding frame. For reasons that will soon become apparent, the outboard wall has a rectangular slot formed therein with a size less than that of the outboard wall. FIGS. 3 and 4 show an interconnect member including a rigid rectangular plate with a planar front face, a planar rear face and a rectangular periphery. Such periphery is defined by a pair of top and bottom long edges and a pair of short side edges. Each of the short side edges has a flange extending both forwardly and rearwardly between the top and bottom long edges. The flanges of each side edge, together, have a size comparable to that of the outboard wall. The flanges of the side edges are each slidably situated within the compartment of the corresponding frame. As such, the lenses may be selectively distanced only within a common plane and along a single lateral axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet sunglasses system apparatus and method which has many of the advantages of the pet accessories mentioned heretofore and many novel features that result in a new pet sunglasses system which is not anticipated, rendered obvious, suggested, or even implied by any of the prior art pet accessories, either alone or in any combination thereof.

It is another object of the present invention to provide a new pet sunglasses system which may be easily and efficiently manufactured and marketed.

It is a further object of the present invention to provide a new pet sunglasses system which is of a durable and reliable construction.

An even further object of the present invention is to provide a new pet sunglasses system which is susceptible of a low cost of manufacture with regard to both materials and labor, and which accordingly is then susceptible of low prices of sale to the consuming public, thereby making such pet sunglasses system economically available to the buying public.

Still yet another object of the present invention is to provide a new pet sunglasses system which provides in the apparatuses and methods of the prior art some of the advantages thereof, while simultaneously overcoming some of the disadvantages normally associated therewith.

Still another object of the present invention is to provide a new pet sunglasses system for protecting eyes of a pet thereby precluding cataracts and other visual injury.

Even still another object of the present invention is to provide a new pet sunglasses system that includes a pair of glasses each having a frame and a lens mounted therein. Each frame has a linear arm having a first end coupled to the frame and extending rearwardly therefrom. An interconnect member is connected to an inboard edge of each of the frames which permits the selective distancing thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
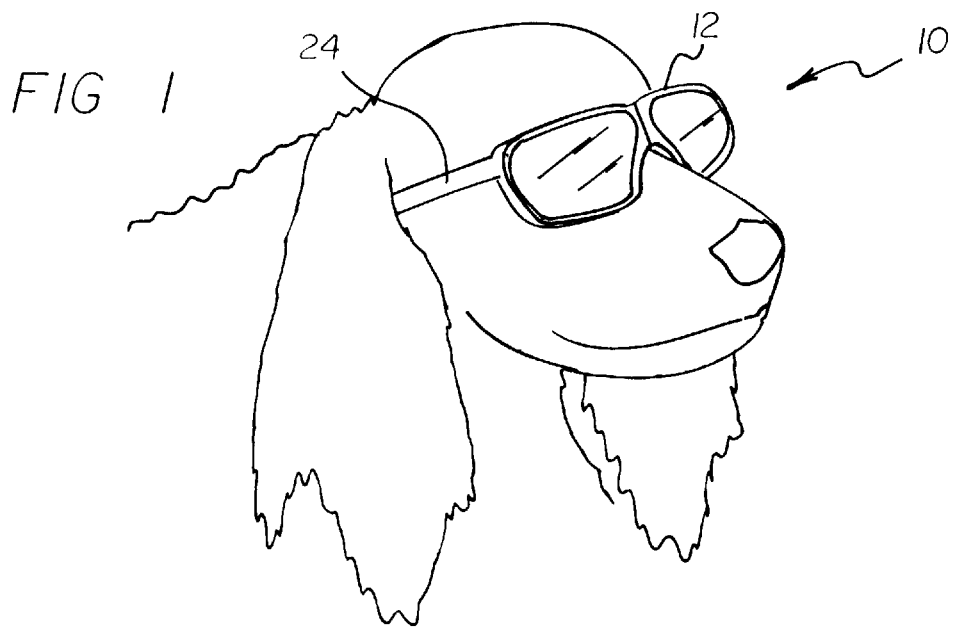
FIG. 1 is a perspective view of a new pet sunglasses system during use according to the present invention.

With reference now to the drawings, and in particular to FIGS. 1 through 4 thereof, a new pet sunglasses system embodying the principles and concepts of the present invention and generally designated by the reference numeral 10 will be described.

Figure 2:
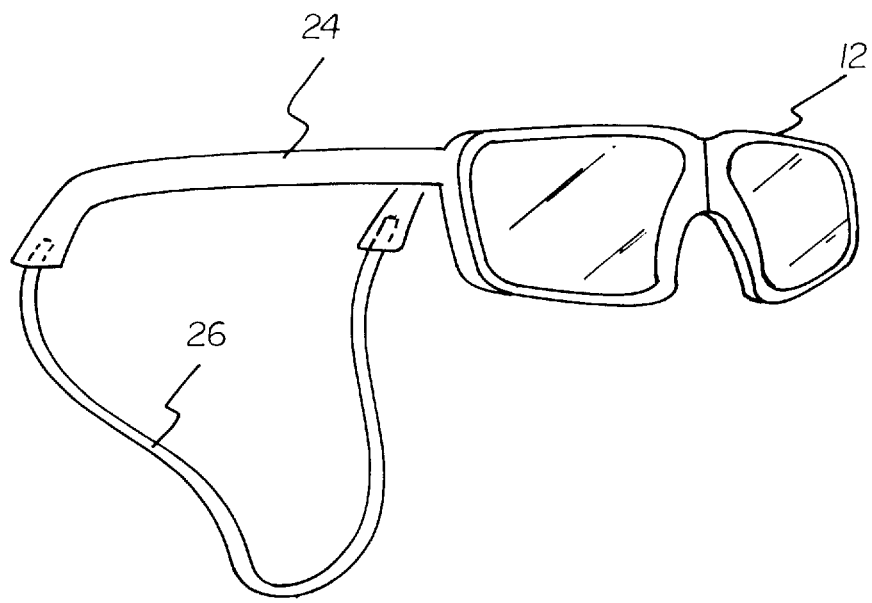
FIG. 2 is a perspective view of the present invention with the strap thereof.

The present invention, designated as numeral 10, comprises a pair of glasses 12 each having a separate generally rectangular frame 14 and a sun-protective lens 16 mounted therein. Each frame is equipped with a linear top and bottom edge and a pair of side edges including an inboard side edge and an outboard side edge. The inboard side edge includes a lower arcuate extent 18 and an upper extent 20 defining a compartment 22. Note FIG. 4. The outboard side edge has a linear arm 24 with a first end fixedly and integrally coupled to an upper extent thereof and extended rearwardly therefrom in perpendicular relation therewith. A second end of each linear arm is slightly downturned, as shown in FIG. 2.

Figure 4:
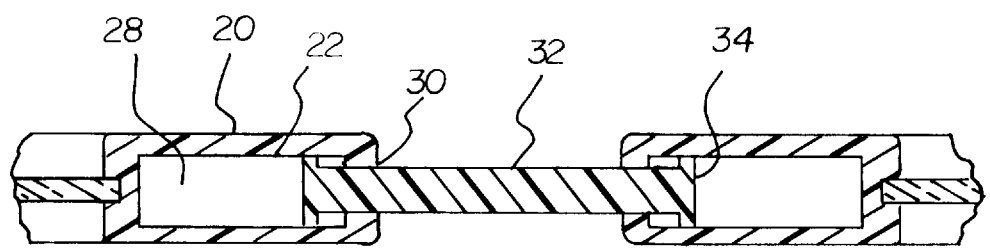
FIG. 4 is a cross-sectional view of the present invention taken along line 4—4 shown in FIG. 4.

Next provided is a flexible and elastic strap 26 having a pair of ends coupled to second ends of the linear arms of the pair of glasses. The pair of compartments are each defined by a front wall, a rear wall, an inboard wall, an outboard wall, a top wall and a bottom wall. As such, an interior space 28 is defined with a rectangular configuration, as shown in FIG. 4. It should be noted that the inboard wall is mounted to the associated lens. Further, the top and bottom walls are mounted to a remaining portion of the corresponding frame.

For reasons that will soon become apparent, the outboard wall has a rectangular slot 30 formed therein with a size less than that of the outboard wall.

Figure 3:
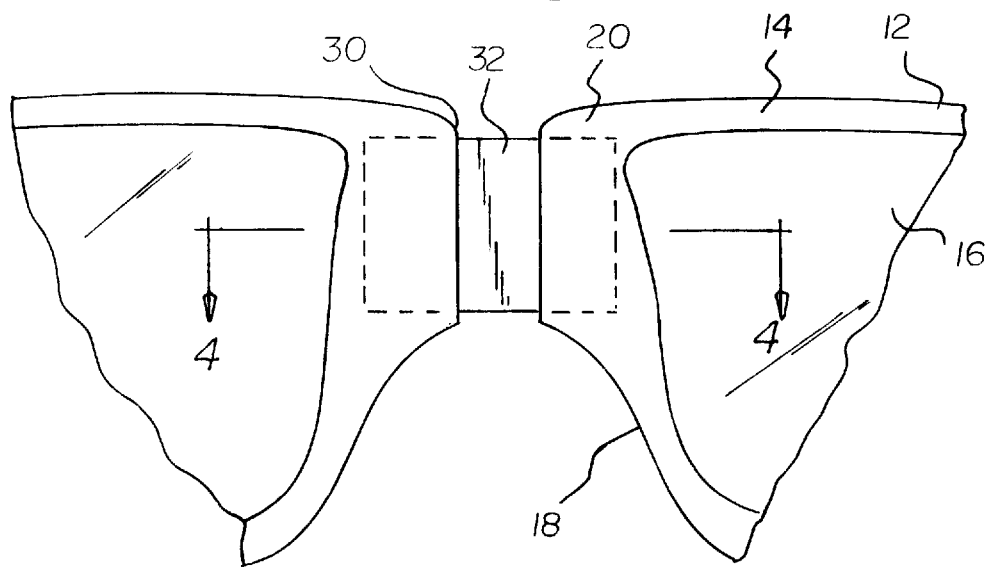
FIG. 3 is a front view of the present invention.

FIGS. 3 and 4 show an interconnect member including a rigid rectangular plate 32 with a planar front face, a planar rear face and a rectangular periphery. Such periphery is defined by a pair of top and bottom long edges and a pair of short side edges. Each of the short side edges has a flange 34 extending both forwardly and rearwardly between the top and bottom long edges. The flanges of each side edge, together, have a size comparable to that of the outboard wall. The flanges of the side edges are each slidably situated within the compartment of the corresponding frame. As such, the lenses may be selectively distanced only within a common plane and along a single lateral axis. During use, the interconnect member permits distancing of the glasses to exceed 2 inches which is critical for accommodating various dogs and the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pair of sunglasses for a small animal comprising, in combination:

a pair of glasses each having a generally rectangular frame and a sun-protective lens mounted therein, the frame equipped with a linear top and bottom edge and a pair of side edges including an inboard side edge and an outboard side edge, the inboard side edge including a lower arcuate extent and an upper extent defining a compartment, the outboard side edge having a linear arm having a first end fixedly and integrally coupled to an upper extent thereof and extending rearwardly therefrom in perpendicular relation therewith and a second end being slightly downturned;

a flexible and elastic strap having a pair of ends coupled to second ends of the linear arms of the pair of glasses;

said compartments each defined by a front wall, a rear wall, an inboard wall, an outboard wall, a top wall and a bottom wall thereby defining an interior space with a rectangular configuration, wherein the inboard wall is mounted to the associated lens and the top and bottom wall are mounted to a remaining portion of the corresponding frame, the outboard wall having a rectangular slot formed therein with a size less than that of the outboard wall; and an interconnect member including a rigid rectangular plate with a planar front face, a planar rear face and a rectangular periphery defined by a pair of top and bottom long edges and a pair of short side edges, each of the short side edges having a flange extending both forwardly and rearwardly between the top and bottom long edges, wherein the flanges of each side edge, together have a size comparable to that of the outboard wall, the flanges of the side edges each being slidably situated within the compartment of the corresponding frame, whereby the lenses may be selectively distanced only within a common plane and along a single lateral axis wherein the interconnect member permits distancing of the glasses at least 2 inches.

2. A pair of glasses for a small animal comprising:

a pair of glasses each having a frame and a lens mounted therein, each frame having a linear arm having a first end fixedly and integrally coupled to the frame and extending rearwardly therefrom, an inboard side edge of each frame including a lower arcuate extent and an upper extent defining a compartment;

a flexible and elastic strap having a pair of ends coupled to second ends of the linear arms of the pair of glasses;

said compartments each defined by a front wall, a rear wall, an inboard wall, an outboard wall, a top wall and a bottom wall thereby defining an interior space, wherein the inboard wall is mounted to the associated lens and the top and bottom wall are mounted to a remaining portion of the corresponding frame, the outboard wall having a slot formed therein with a size less than that of the outboard wall; and an interconnect member including a rigid plate with a front face, a rear face and a periphery defined by a pair of top and bottom long edges and a pair of short side edges, each of the short side edges having a flange extending both forwardly and rearwardly between the top and bottom long edges, wherein the flanges of each side edge, together have a size comparable to that of the outboard walls, the flanges of the side edges each being slidably situated within the compartment of the corresponding frame, whereby the lenses may be selectively distanced at least 2 inches.

3. A pair of glasses as set forth in claim 2 whereby the lenses are only selectively distanced within a common plane.

4. A pair of glasses as set forth in claim 2 whereby the lenses are only selectively distanced along a single lateral axis.

5. A pair of glasses as set forth in claim 2 wherein the lenses are fixedly and integrally coupled to the associated frame.

6. A pair of glasses as set forth in claim 2 wherein the lenses are sun-protective.

* * * * *